United States Patent [19]

Hibino et al.

[11] Patent Number: 5,765,371
[45] Date of Patent: Jun. 16, 1998

[54] APPARATUS FOR CONTROLLING INTERNAL COMBUSTION ENGINE HAVING ELECTRICALLY HEATED CATALYST

[75] Inventors: Masahiko Hibino, Susono; Ichiro Hosotani, Numazu, both of Japan

[73] Assignee: Toyota Jidosha Kabushiki Kaisha, Aichi, Japan

[21] Appl. No.: 760,826

[22] Filed: Dec. 5, 1996

[30] Foreign Application Priority Data

Dec. 8, 1995 [JP] Japan .................................. 7-320361

[51] Int. Cl.$^6$ .................................................. F01N 3/20
[52] U.S. Cl. .......................... 60/284; 60/286; 60/300; 219/202; 422/174
[58] Field of Search .......................... 60/284, 286, 300, 60/303; 219/202; 422/174, 199

[56] References Cited

U.S. PATENT DOCUMENTS 5,321,231  6/1994  Schmalzriedt et al. ............. 60/300 X
5,609,024  3/1997  Fujiwara et al. ..................... 60/284

FOREIGN PATENT DOCUMENTS 6-101459  4/1994  Japan .

OTHER PUBLICATIONS

Liang, P. M., "Development of an Alternator–Powered Electrically–Heated Catalyst System", SAE Paper 941042, Feb. 1994.

*Primary Examiner*—Tony M. Argenbright
*Attorney, Agent, or Firm*—Kenyon & Kenyon

[57] ABSTRACT

An apparatus for controlling an internal combustion engine having an electrically heated catalyst heats the catalyst with sufficient power without fluctuating the rotation speed of the engine. The apparatus has an alternator 2 driven by the engine 1, an intake controller 3 disposed in an intake system of the engine 1, to change the quantity of intake air, a battery 8 charged by the alternator 2, the catalyst 4 disposed in an exhaust system of the engine 1 and powered by the battery 8 and alternator 2, and a regulator 7 for changing the field current of the alternator 2, to change power to be generated by the alternator 2. When activating the catalyst 4, the intake controller 3 increases the quantity of intake air, and the regulator 7 increases power to be generated by the alternator 2. Increasing the field current of the alternator 2 is delayed behind increasing the quantity of intake air. Alternatively, increasing the quantity of intake air as well as the field current of the alternator 2 are carried out gradually.

2 Claims, 16 Drawing Sheets

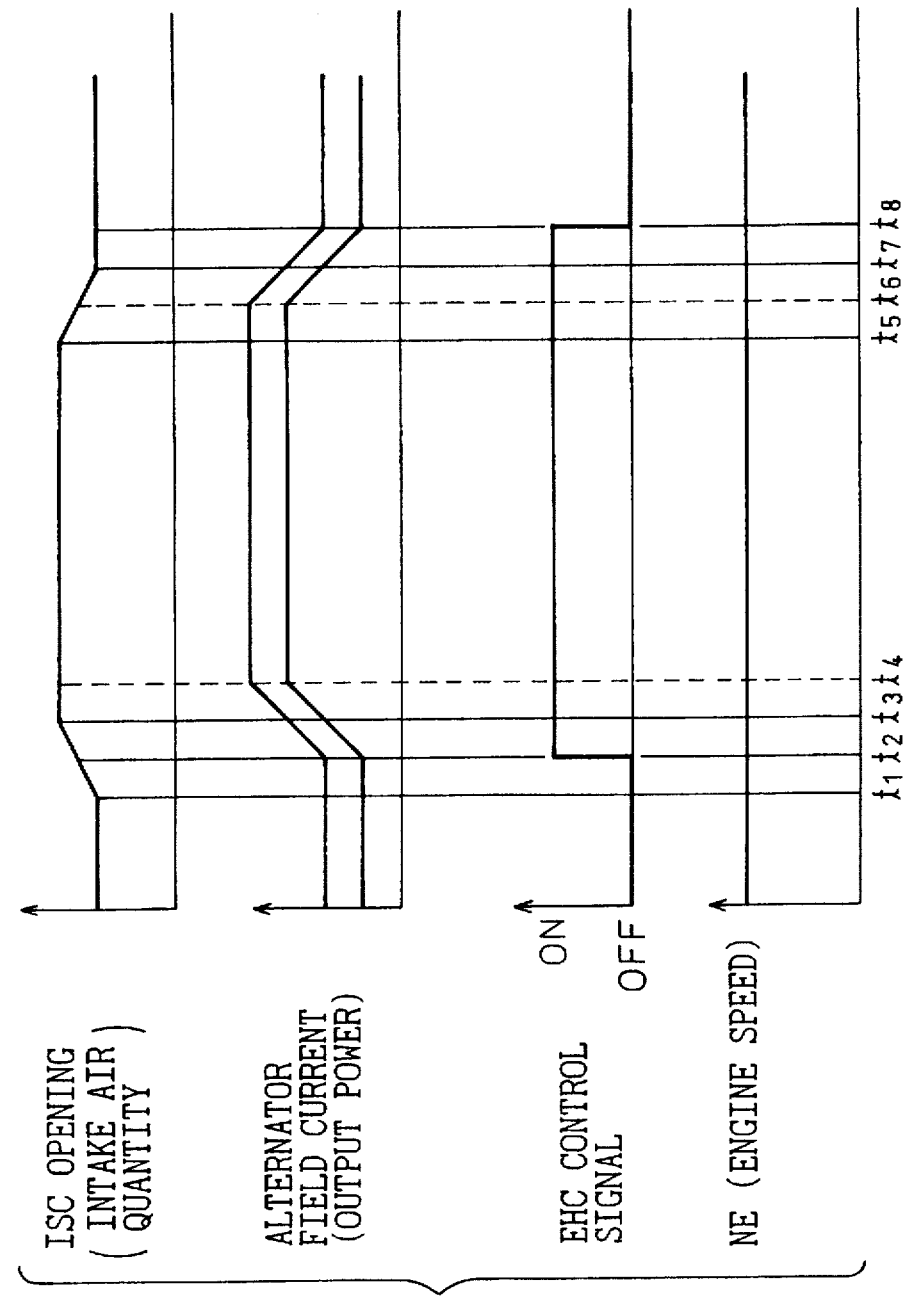

APPARATUS FOR CONTROLLING INTERNAL COMBUSTION ENGINE HAVING ELECTRICALLY HEATED CATALYST

BACKGROUND OF THE INVENTION

1. Field of the Invention

The present invention relates to an apparatus for controlling an internal combustion engine having an electrically heated catalyst, and particularly, to one having an alternator driven by the engine, a battery charged by the alternator, a unit for changing an engine speed, the electrically heated catalyst powered by the alternator or battery, and a unit for changing the output power of the alternator.

2. Description of the Related Art

An exhaust system of an internal combustion engine employs a catalyst to remove toxic substances such as HC, CO, and NOx from exhaust gas. The catalyst purifies exhaust gas only after it is heated above an activation temperature. The catalyst is usually heated by hot exhaust gas from the engine and gradually reaches the activation temperature. If the engine is cold when it is started, it will take time to heat the catalyst to the activation temperature because the temperature of exhaust gas is low at first. Until the catalyst is activated, the exhaust gas is insufficiently purified.

To solve this problem, an electrically heated catalyst (EHC) has been proposed. The EHC has a catalyst and a carrier to which a current is applied at the start of the engine to quickly heat the catalyst up to an activation temperature. An example of the EHC is disclosed, in Japanese Unexamined Patent Publication No. 5-179939, that draws power from a battery. The heater consumes a large amount of power, causing a voltage drop in the battery. To prevent such voltage drop, Japanese Unexamined Patent Publication No. 6-101459 checks an idling state and a heater operation. If the heater is operating while the engine is idling, the disclosure increases the quantity of intake air by controlling an electronic throttle or an idling speed controller (ISC). As the quantity of intake air increases, air-fuel ratio control adopted by the engine increases the quantity of injecting fuel to increase the torque and speed of the engine. This increases the output power of an alternator to compensate for the voltage drop in the battery. This prior art is applicable not only when supplying power from the battery to the heater but also when supplying power directly from the alternator to the heater. In each case, the prior art may increase an engine speed to increase the output power of the alternator when the heating of the catalyst consumes large amounts of power.

Increasing the engine speed higher than a normal speed, however, provides the driver with an uncomfortable feeling. The catalyst is electrically heated usually at the start of the engine, i.e., during an idling period in which the driver easily senses even a small change in the engine speed. This problem will be explained in detail with reference to drawings.

FIG. 13 shows a prior art apparatus for controlling an internal combustion engine having an electrically heated catalyst (EHC). The apparatus includes an alternator 2 driven by the engine 1, an intake controller 3 disposed in an intake system of the engine 1 to control the quantity of intake air, and the EHC 4 disposed in an exhaust system of the engine 1. The EHC 4 has an electric heater that receives power from the alternator 2. A three-way catalyst 4a is disposed in the exhaust system downstream from the EHC 4. The catalyst 4a has no heater and is heated by the heat of exhaust gas. The intake controller 3 may be an electronic throttle that responds to an accelerator or to an electronic control unit 5, to drive a stepping motor in a forward or reverse direction to increase or decrease the quantity of intake air. The intake controller 3 may be an idling speed controller (ISC) to be explained later. The control unit 5 may be a microcomputer having a CPU, a ROM, a RAM, an input interface, an output interface, and a bi-directional bus to connect the components to one another.

A water temperature sensor (not shown) provides the temperature of water for cooling the engine 1. A crank angle sensor (not shown) provides a crank angle of the engine 1, which is used to calculate an engine speed. The water temperature and engine speed are used by a state detector 6 for determining whether or not the EHC 4 is active. A regulator 7 changes the field current of the alternator 2, thereby changing the output power of the alternator 2. A switching unit 19 connects the alternator 2 to the EHC 4 only when the state detector 6 determines that the EHC 4 is inactive. The alternator 2 always supplies power to a battery 8, which supplies power to the control unit 5, regulator 7, and other parts. The regulator 7 adjusts the field current of the alternator 2, to compensate for a voltage drop in the battery 8 due to a change in load on the engine 1. Correction of the field current of the alternator 2 is carried out by controlling the duty factor of the field current.

When the state detector 6 determines that the EHC 4 is inactive, the intake controller 3 increases the quantity of intake air. Since the alternator 2 supplies power to the battery 8 too, the regulator 7 controls the field current of the alternator 2 to suppress the output voltage of the alternator 2 below about 15 V, thereby avoiding damage to the battery 8. When the state detector 6 determines that the EHC 4 is active, the switching unit 19 disconnects the alternator 2 from the EHC 4. An engine speed control operation of the apparatus of FIG. 13 will be explained.

FIG. 14 is a time chart showing the engine speed control operation of the prior art. The intake controller 3 is an idling speed controller (ISC), and the switching unit 19 is a control relay. An abscissa of the time chart represents time. The EHC 4 is inactive between t1 and t10. The state detector 6 detects that the temperature of engine cooling water is below 35° C. at t1. The control unit 5 switches the relay 19 so that the alternator 2 may supply power to both the battery 8 and EHC 4. At the same time, the control unit 5 enlarges the opening of a throttle valve (to be explained later) of the ISC 3. As a result, the quantity of intake air starts to rise between t1 and t2, and air-fuel ratio control adopted by the engine 1 increases the quantity of injecting fuel in response to the increase in the intake air quantity, thereby increasing the torque and speed NE of the engine 1. When power supply to the EHC 4 starts at t1, load on the battery 8 increases to cause a voltage drop in the battery 8. At time t2, the regulator 7 increases the field current of the alternator 2 so that the battery 8 restores an original voltage level between t2 and t3. Increasing the output power of the alternator 2 increases load on the engine 1, and therefore, the engine speed NE drops between t2 and t3. The engine speed NE is higher at t3 than at t1.

The state detector 6 detects that the water temperature is above 35° C. at t10. The control unit 5 switches the relay 19 to disconnect the alternator 2 from the EHC 4 and closes the ISC 3. As a result, the quantity of intake air to the engine 1 decreases between t10 and t11, and therefore, the air-fuel ratio control reduces the quantity of injecting fuel. This results in dropping the torque and speed of the engine 1. Since no power is supplied to the EHC 4 from t10, load on the battery 8 decreases to increase the voltage thereof. At t11, the regulator 7 decreases the field current of the alternator 2 so that the battery 8 is restored to the original voltage level between t11 and t12. Decreasing the output power of the alternator 2 decreases load on the engine 1 between t11 and t12. As a result, the engine speed NE increases to an original level. In this way, the engine speed NE between t1 and t12 is mostly higher than a normal idling speed.

An object of the present invention is to provide an apparatus for controlling an internal combustion engine having an electrically heated catalyst (EHC), capable of supplying sufficient power to heat the EHC without fluctuating an engine speed.

SUMMARY OF THE INVENTION

In order to accomplish the object, a first aspect of the present invention provides an apparatus for controlling an internal combustion engine, having an alternator driven by the engine, a battery charged by the alternator, a unit for changing the rotational speed of the engine, an electrically heated catalyst (EHC) that receives power from the alternator or battery, and a unit for changing power to be generated by the alternator. When the EHC receives power, the engine speed changing unit increases the rotation speed of the engine, and the generating power changing unit increases power to be generated by the alternator.

The first aspect increases the rotational speed of the engine as well as generating power when supplying power to the EHC. This results in quickly activating the EHC and increasing the load on the engine. To maintain the engine speed against the increasing load on the engine, the first aspect increases, for example, the quantity of intake air. This increases the quantity of injected fuel and the torque of the engine, thereby maintaining the engine speed.

The present invention also lets the generating power changing unit change the field current of the alternator, to change power generated by the alternator, and delays an increase of the field current of the alternator until a predetermined time has elapsed after an increase of the quantity of intake air.

There is a delay between an increase in the quantity of intake air and feeding the increased intake air into the engine. Also, there is a delay until the increased intake air and accordingly increased fuel cause an increase in the torque of the engine. To handle these delays, the invention delays increasing the field current of the alternator behind until after the increase in the quantity of intake air. As a result, the field current of the alternator, i.e., load on the engine is increased after the torque of the engine is increased. This results in quickly heating the EHC without decreasing the engine speed.

The present invention also lets the generating power changing unit change the field current of the alternator, to change power generated by the alternator, and gradually increases the quantity of intake air as well as the field current of the alternator.

The invention gradually increases the quantity of intake air, and accordingly, the quantity of injected fuel. This results in gradually increasing the torque of the engine. As the torque of the engine increases, the invention gradually increases the field current of the alternator, to gradually increase load on the engine. Consequently, the invention quickly activates the EHC without fluctuating an engine speed.

BRIEF DESCRIPTION OF THE DRAWINGS

FIG. 6 is a time chart showing a second post-engine-start control technique that controls an engine speed after the start of the engine according to the present invention;

DESCRIPTION OF THE PREFERRED EMBODIMENTS

Figure 1:
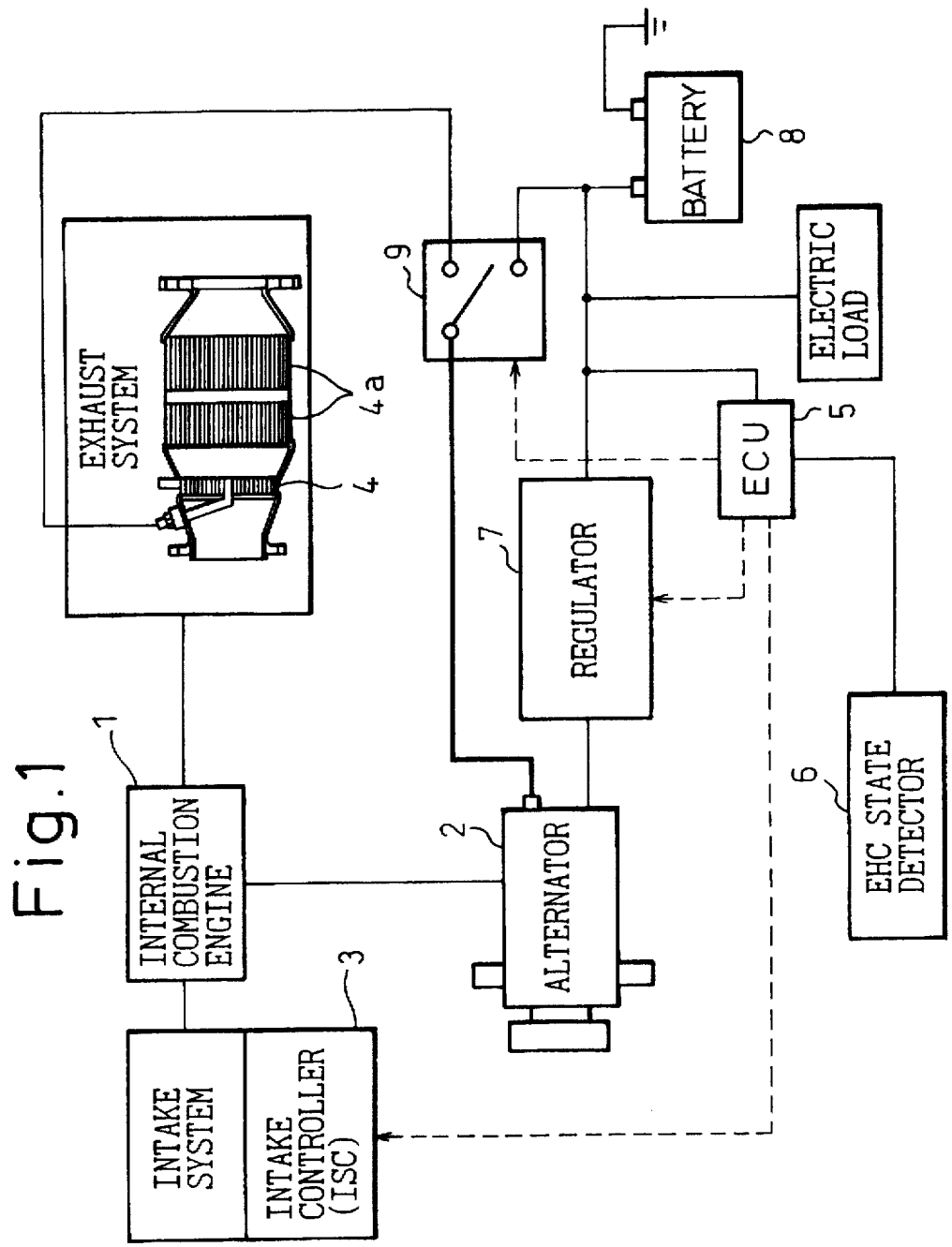
FIG. 1 generally shows an apparatus for controlling an internal combustion engine having an electrically heated catalyst according to an embodiment of the present invention.
Figure 13:
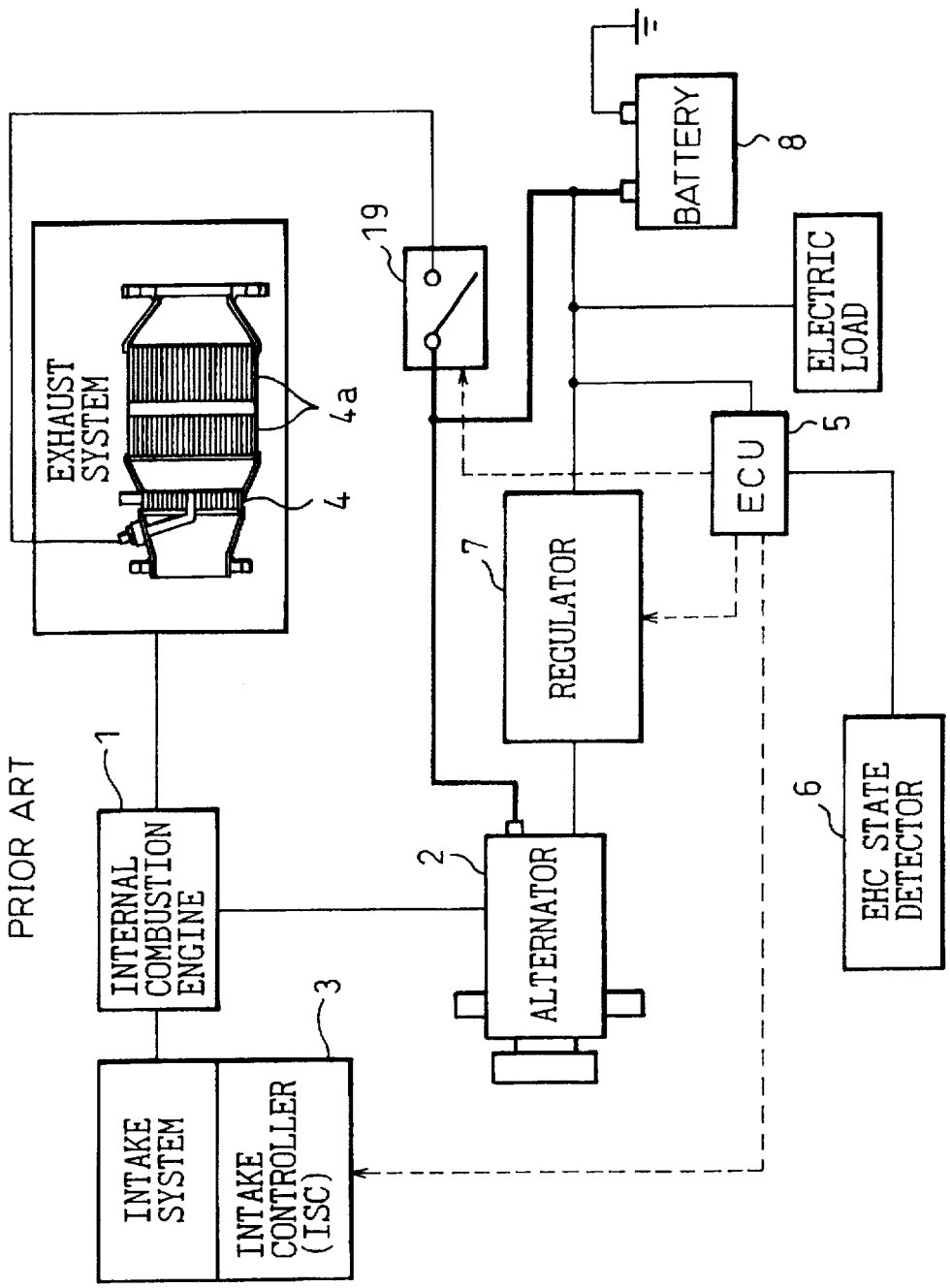
FIG. 13 shows an apparatus for controlling an internal combustion engine having an electrically heated catalyst according to a prior art.
Figure 14:
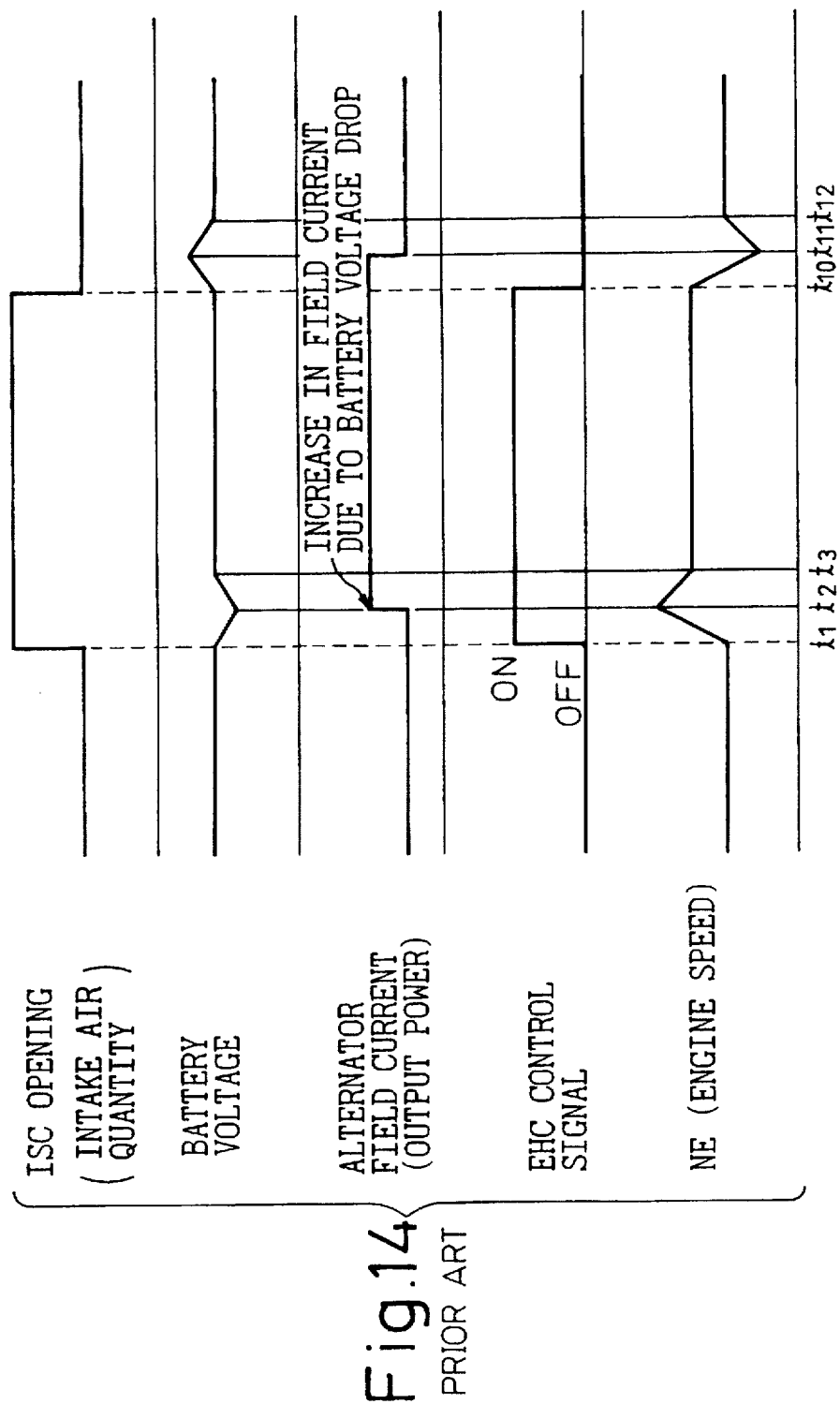
FIG. 14 is a time chart showing a technique of controlling an engine speed according to the prior art.

FIG. 1 shows an apparatus for controlling an internal combustion engine having an electrically heated catalyst (EHC) according to an embodiment of the present invention. The embodiment differs from the prior art of FIG. 13 in that it has a switching unit 9 that supplies power generated by an alternator 2 to a battery 8 or to the EHC 4, and an engine control unit 5 that carries out specific control operations. The other arrangements of the embodiment are substantially the same as those of FIG. 13. The switching unit 9 supplies power generated by the alternator 2 to the EHC 4 when the EHC 4 is inactive, and to the battery 8 when the EHC 4 is active. An intake controller 3 is an idling speed controller (ISC), which changes the quantity of intake air to be fed into the engine 1, to change the rotational speed of the engine 1.

Thus the intake controller 3 operates as the engine speed means according to the present invention.

A state detector 6 detects the state of the EHC 4. If the state detector 6 determines that the EHC 4 is inactive, the control unit 5 lets the intake controller 3 increase the quantity of intake air and a regulator 7 increase power to be generated by the alternator 2. In this case, the alternator 2 supplies power only to the EHC 4 and supplies no power to the battery 8. Namely, there is no need to control the field current of the alternator 2 to suppress the output voltage of the alternator 2 below about 15 V to avoid a breakage of the battery 8 while the alternator 2 is supplying power to the EHC 4. Accordingly, it is possible to increase the output voltage of the alternator 2 up to, for example, 20 to 30 V. Thus, the EHC 4 can be quickly activated. If the state detector 6 determines that the EHC 4 is active, the control unit 5 lets the switching unit 9 connect the output power of the alternator 2 to the battery 8. In this case, power is not supplied to the EHC 4 but is supplied to the battery 8, and therefore, the regulator 7 adjusts the field current of the alternator 2 to suppress the output voltage of the alternator 2 below about 15 V.

Figure 2:
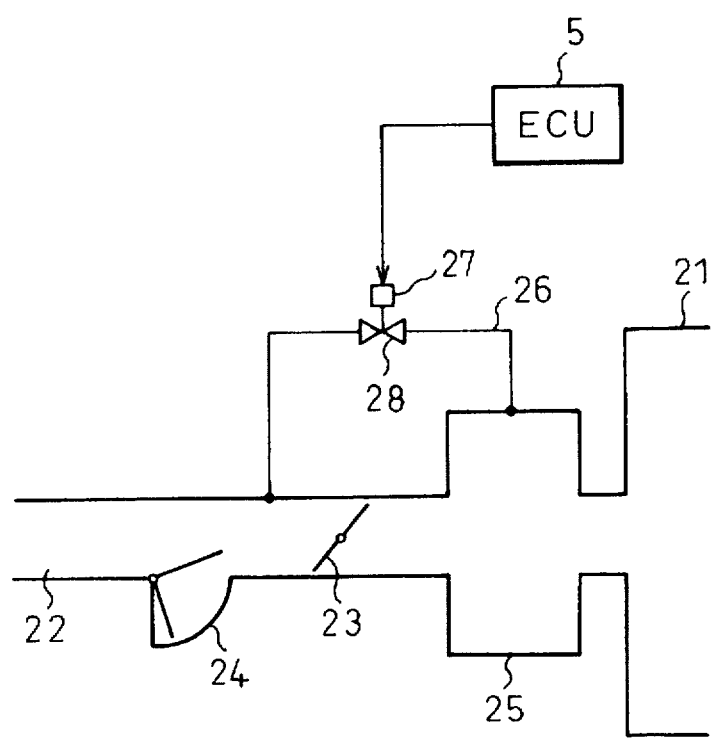
FIG. 2 shows an idling speed controller (ISC)

The idling speed controller (ISC) serving as the intake controller 3 will briefly be explained with reference to FIG. 2.

The idling speed controller involves an engine 21, an intake duct 22, a throttle valve 23, an airflow meter 24, and a surge tank 25. A bypass 26 bypasses the throttle valve 23, to connect a part of the intake duct 22 between the throttle valve 23 and the airflow meter 24 with the surge tank 25. An idling speed control valve 28 is arranged in the bypass 26 and is driven by an actuator 27 such as a stepping motor. The actuator 27 is connected to the output interface of the control unit 5 of FIG. 1, so that the control unit 5 controls the opening of the valve 28 through the actuator 27, to control the quantity of intake air independently of the throttle valve 23.

Four techniques of controlling an engine speed with the use of the apparatus of FIG. 1 will be explained with reference to time charts and flowcharts.

Figure 3:
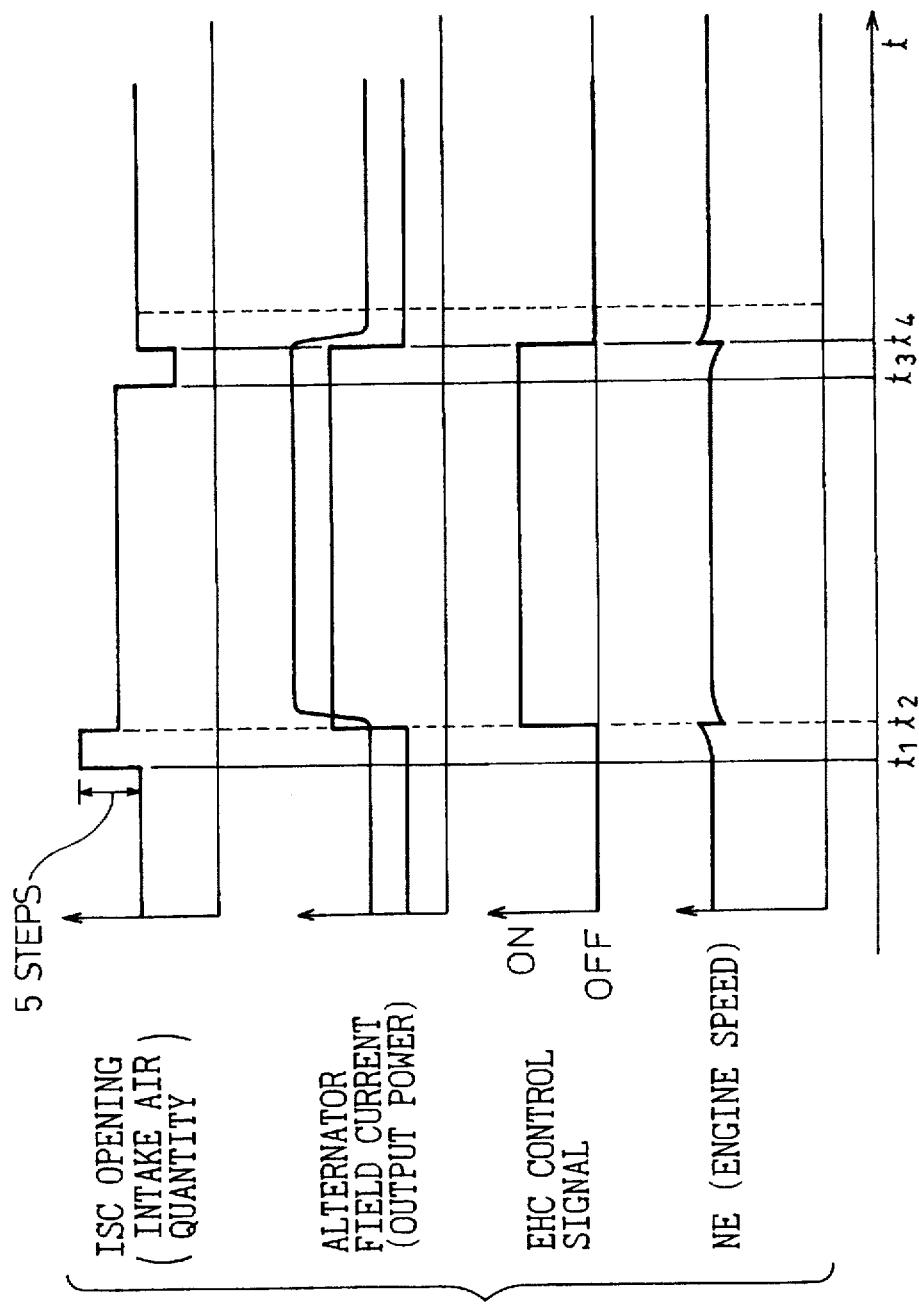
FIG. 3 is a time chart showing a first post-engine-start control technique that controls an engine speed after the start of the engine according to the present invention.
Figure 4:
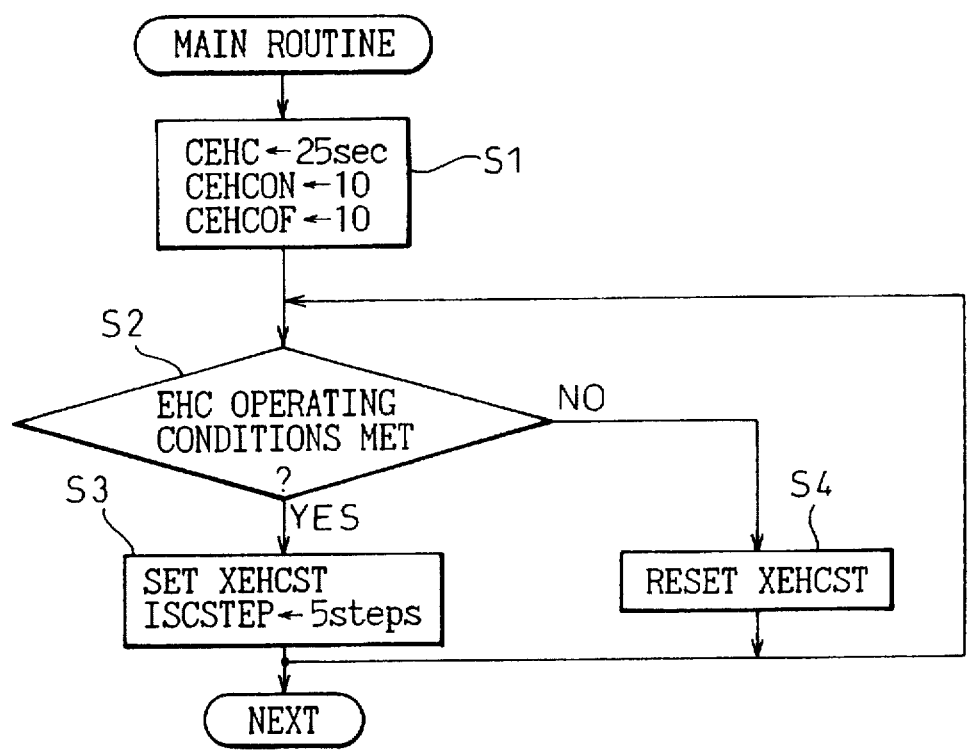
FIG. 4 is a flowchart showing a main routine of the first post-engine-start control technique.
Figure 5A:
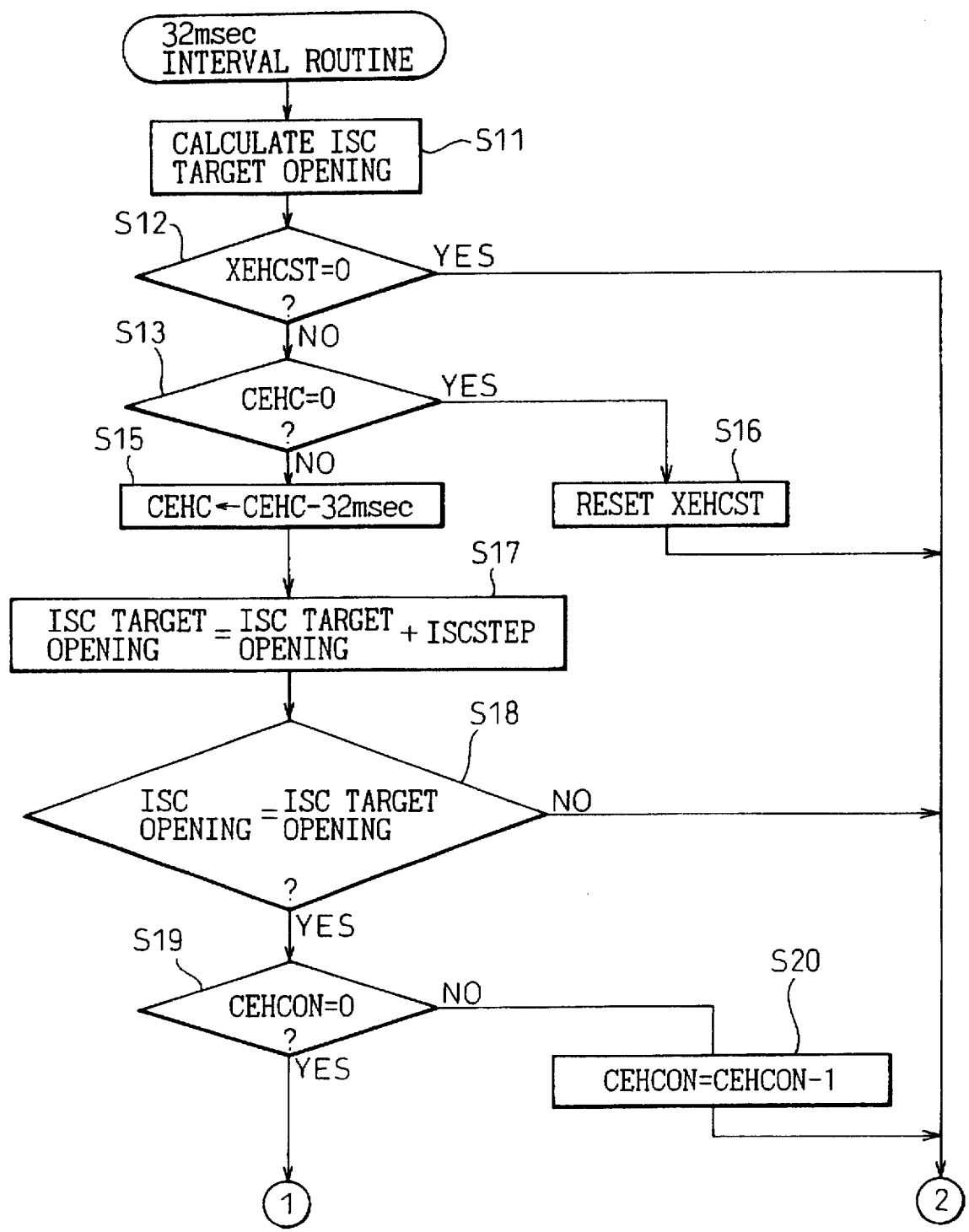
FIG. 5A is half of a flowchart showing an interrupt routine of the first post-engine-start control technique.
Figure 5B:
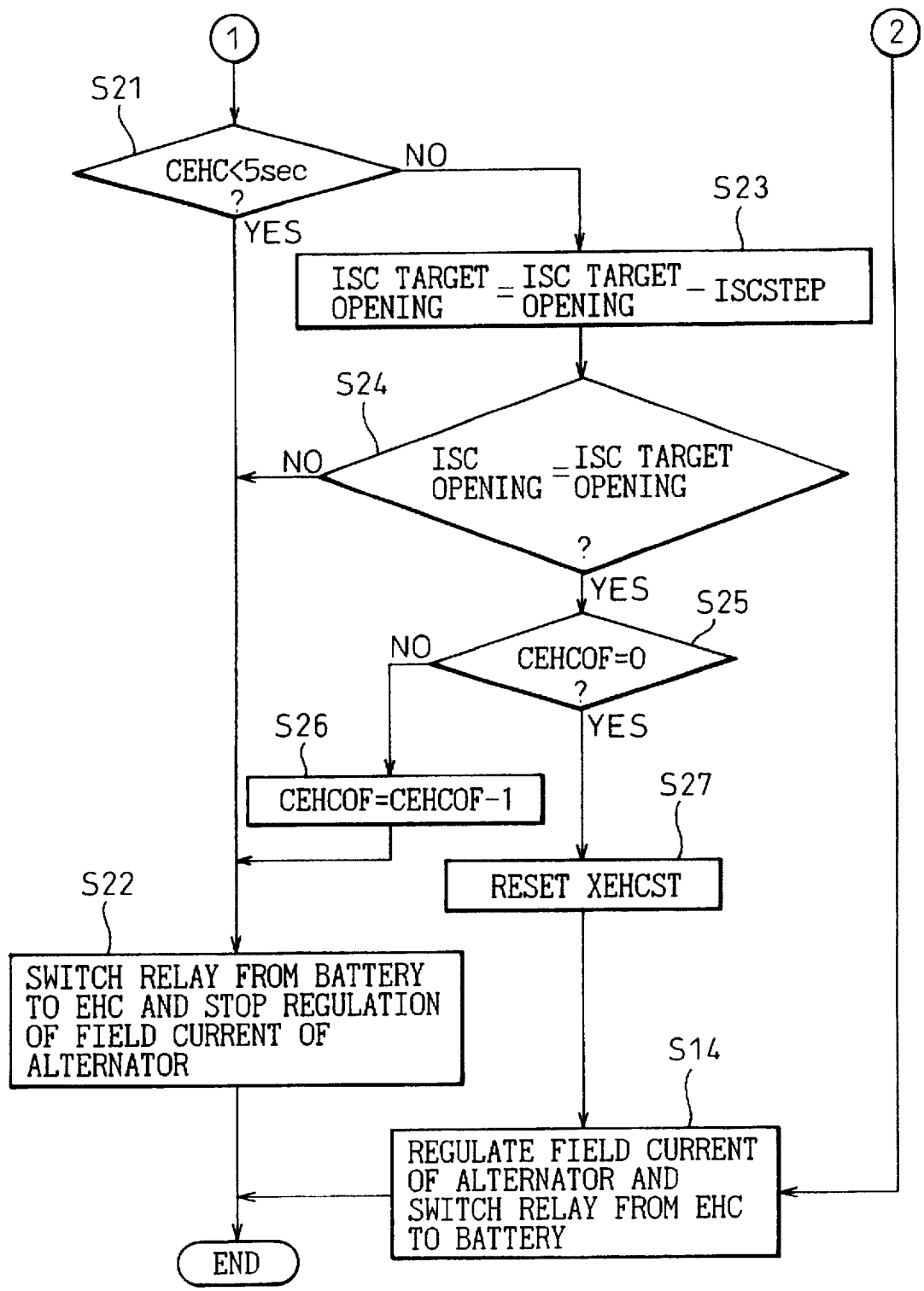
FIG. 5B is another half of a flowchart shown in FIG. 5A.

FIG. 3 is a time chart showing the first post-engine-start control technique. FIG. 4 is a flowchart showing a main routine of the technique, and FIGS. 5A and 5B are a flowchart showing an interrupt routine of the technique carried out at intervals of 32 milliseconds (msec). In the time charts shown after FIG. 3, the abscissa represents time.

The main routine of FIG. 4 is carried out at intervals of several milliseconds. Step S1 sets an EHC total operation time counter CEHC to 25 seconds (sec), an EHC start time counter CEHCON to 10, and an EHC end time counter CEHCOF to 10. Step S2 checks to see if $NE \geq 400$ rpm and $-10° C. \leq THW \leq 35° C.$ where NE is an engine speed and THW is the temperature of engine cooling water, to determine whether or not conditions to activate the EHC 4 are met. If the conditions are met, step S3 is carried out, and if not, step S4 is carried out. Step S3 sets an EHC start flag XEHCST to ON and an increment ISCSTEP for opening the ISC valve (28 of FIG. 2) to 5 steps. Step S4 resets the flag XEHCST to OFF. These data are used by the interrupt routine of FIGS. 5A and 5B. After steps S3 and S4, another main routine for controlling the engine 1 is carried out. The interrupt routine will be explained.

The interrupt routine of FIGS. 5A and 5B is carried out at intervals of 32 msec. Step S11 calculates a target opening of the idling speed controller (ISC) valve (28 of FIG. 2) according to the water temperature THW and engine speed NE. Steps S12 to S17 check the flag XEHCST to see if the conditions to activate the EHC 4 are met. When the conditions are met at t1 (FIG. 3), the EHC total operation time counter CEHC is decremented by 32 msec. When the EHC operating conditions are met at t1, the target opening of the ISC valve is incremented by 5 steps. Steps S12 to S17 will individually be explained.

Step S12 checks the EHC start flag XEHCST to see if it is OFF. If the flag is OFF, namely if XEHCST=0, step S14 is carried out, and if not, step S13 is carried out.

Step S13 checks the EHC total operation time counter CEHC to see if it is zero. If it is not zero, step S15 is carried out, and if it is zero, step S16 is carried out.

Step S14 adjusts the field current of the alternator 2 for the battery 8, and switches the relay 9 from the EHC 4 to the battery 8. Then, the interrupt routine ends.

Step S15 calculates CEHC=CEHC (sec)−32 (msec). If the result is negative, the EHC total operation time counter CEHC is zeroed.

If step S13 determines that CEHC=0, i.e., 25 seconds have passed after the start of the routine, step S16 resets the EHC start flag XEHCST to OFF, and step S14 is carried out. It was experimentally confirmed that the EHC 4 becomes active after 25 seconds of continuous energization.

Step S17 increments the target opening of the ISC valve calculated in step S11 by ISCSTEP of 5 steps set in step S3 and tries for the target opening at t1.

Steps S18 to S20 confirm whether or not the ISC valve has attained the target opening and whether or not a period of 320 msec has passed according to the EHC start time counter CEHCON. These steps will individually be explained.

Step S18 determines whether or not the ISC valve has attained the target opening. If the target opening has been attained, step S19 is carried out, and if not, step S14 is carried out.

Step S19 checks to see if CEHCON=0, i.e., if the interrupt routine has been carried out 10 times, i.e., if a period of 320 msec has passed. If CEHCON=0, step S21 is carried out, and if not, step S20 is carried out.

Step S20 calculates CEHCON=CEHCON−1. Then, step S14 is carried out.

Step S21 checks to see if CEHC<5 (sec), i.e., if 20 seconds have passed after t1. If 20 seconds have not passed yet, i.e., if it is between t2 (320 msec after t1) and t3 (20 seconds after t1), step S22 is carried out. If 20 seconds have passed, step S23 reduces the opening of the ISC valve by 5 steps. At t4 (320 msec after t3), step S14 is carried out. Step S14 suppresses the field current of the alternator 2 and switches the relay 9 from the EHC 4 to the battery 8. Steps S21 to S27 will be explained in detail.

Step S21 checks the EHC total operation time counter CEHC to see if CEHC<5 (sec). If CEHC<5, step S22 is carried out, and if not, step S23 is carried out. If CEHC<5 (sec), it is determined that 20 seconds have passed after t1.

Step S22 switches the relay 9 from the battery 8 to the EHC 4, then stops regulation of the field current of the alternator 2 so that the field current can be increased above a limit set for the battery 8. Then, the interrupt routine ends.

Step S22 switches the relay 9 from the battery 8 to the EHC 4 at t2, which is 320 msec behind t1. The opening of the ISC valve is increased at t1, and 320 msec later, the quantity of intake air into the engine 1 is increased accordingly. In response to this, the air-fuel ratio control increases the quantity of injecting fuel. This results in increasing the torque of the engine 1. Although the load on the engine 1 is increased at t2 when the alternator 2 starts to supply power to the EHC 4 and the regulator 7 increases the field current of the alternator 2, the engine speed NE will be unchanged because the torque of the engine 1 is increased. In practice, however, the quantity of intake air to the engine 1 is gradually increased from t1 to t2, and accordingly, the engine speed NE gradually increases. At t2, the output power of the alternator 2 is suddenly increased to increase load on the engine 1, and therefore, the engine speed NE slightly drops without providing the driver with an uncomfortable feeling. This drop in the engine speed NE at t2 makes step S11 decrease the target opening of the ISC valve.

Step S23 subtracts ISCSTEP of 5 steps set in step S3 from the target opening of the ISC valve calculated in step S11 and tries for the new target opening at t3.

Step S24 checks to see if the ISC valve has attained the target opening. If attained, step S25 is carried out, and if not, step S22 is carried out.

Step S25 checks to see if CEHCOF=0, i.e., if the interrupt routine has been executed 10 times after t3, i.e., if 320 milliseconds have passed after t3. If CEHCOF=0, step S27 is carried out at t4, and if not, step S26 is carried out.

Step S26 calculates CEHCOF=CEHCOF-1. Then step S22 is carried out.

Step S27 resets the EHC start flag XEHST to OFF, and step S14 is carried out.

In this way, the opening of the ISC valve is reduced at t3, and 320 msec after t3, the quantity of intake air to the engine 1 is reduced accordingly. In response to the reduced intake air, the air-fuel ratio control reduces the quantity of injecting fuel, to drop the torque of the engine 1. At t4, the alternator 2 stops supplying power to the EHC 4 and starts supplying power to the battery 8. The regulator 7 suppresses the field current of the alternator 2, and therefore, load on the engine 1 drops. In spite of this, the engine speed NE is unchanged because the torque of the engine 1 has been reduced by decreasing the opening of the ISC valve. In practice, the quantity of intake air to the engine 1 is gradually reduced during the period between t3 and t4, and accordingly, the engine speed NE gradually slows down. At t4, the output power of the alternator 2 suddenly drops, and therefore, load on the engine 1 drops to increase the engine speed NE without giving the driver an unpleasant feeling. This increase in the engine speed NE at t4 makes step S11 increase the target opening of the ISC valve up to the original level.

Figure 7:
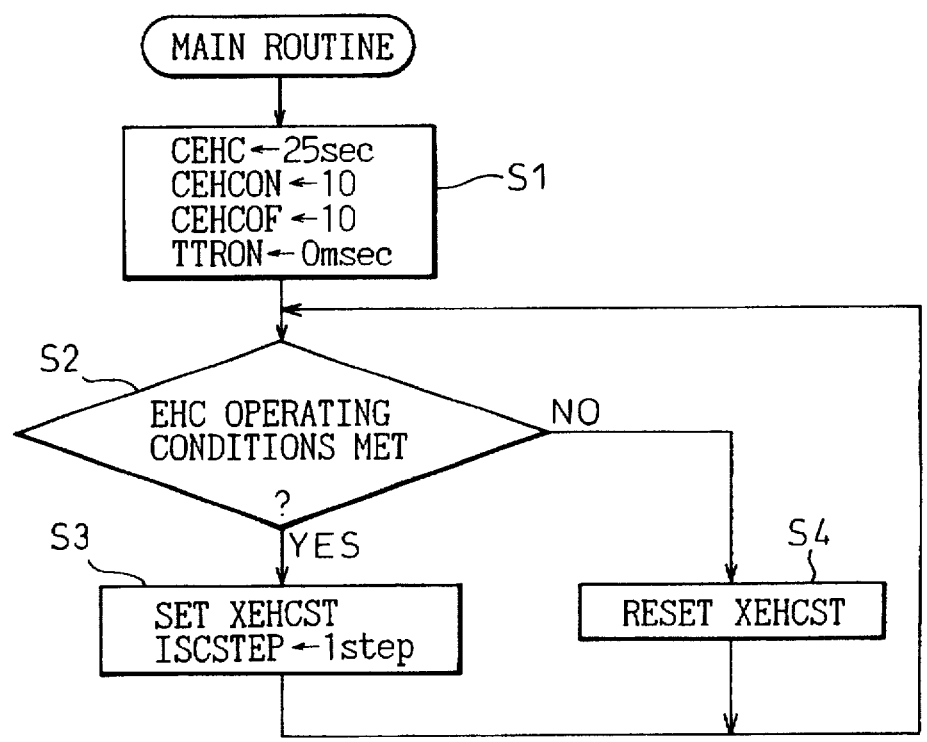
FIG. 7 is a flowchart showing a main routine of the second post-engine-start control technique.
Figure 8A:
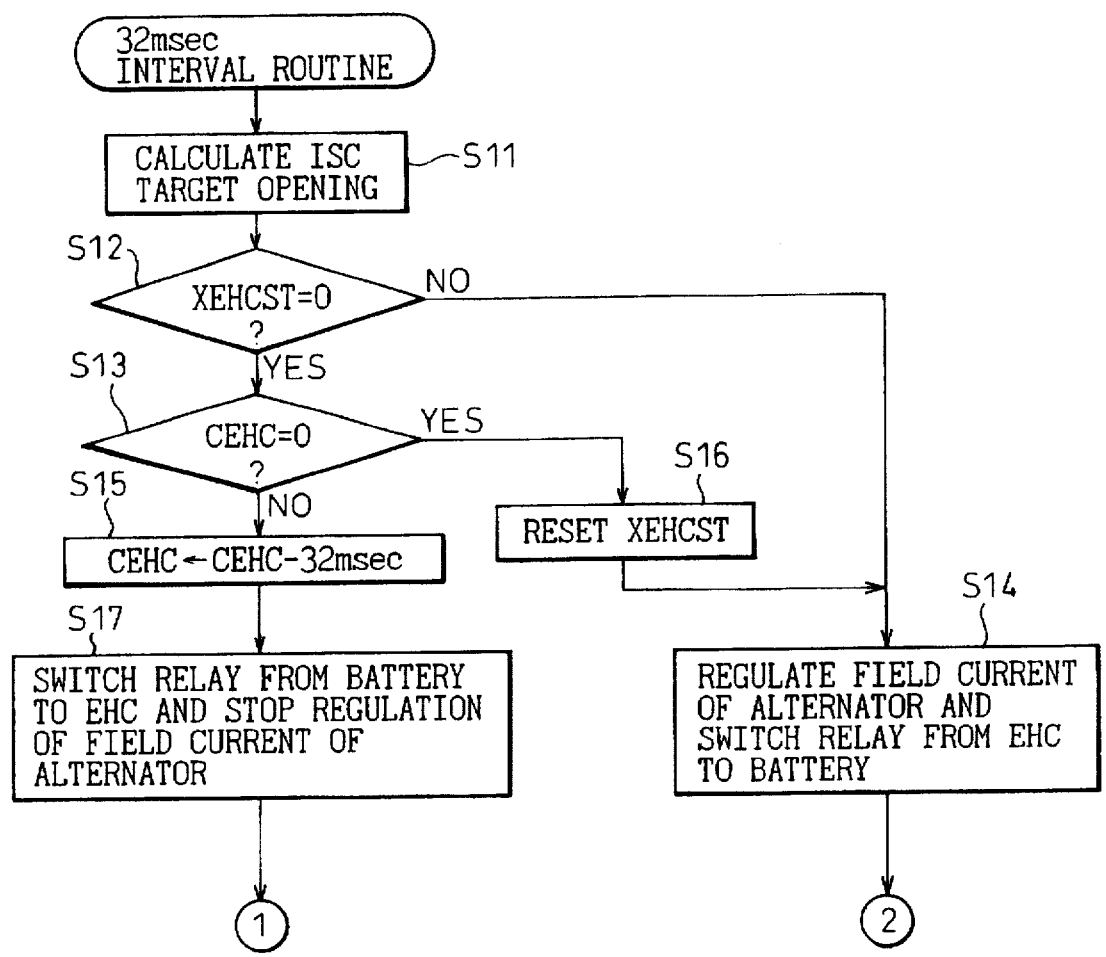
FIG. 8A is half of a flowchart showing an interrupt routine of the second post-engine-start control technique.
Figure 8B:
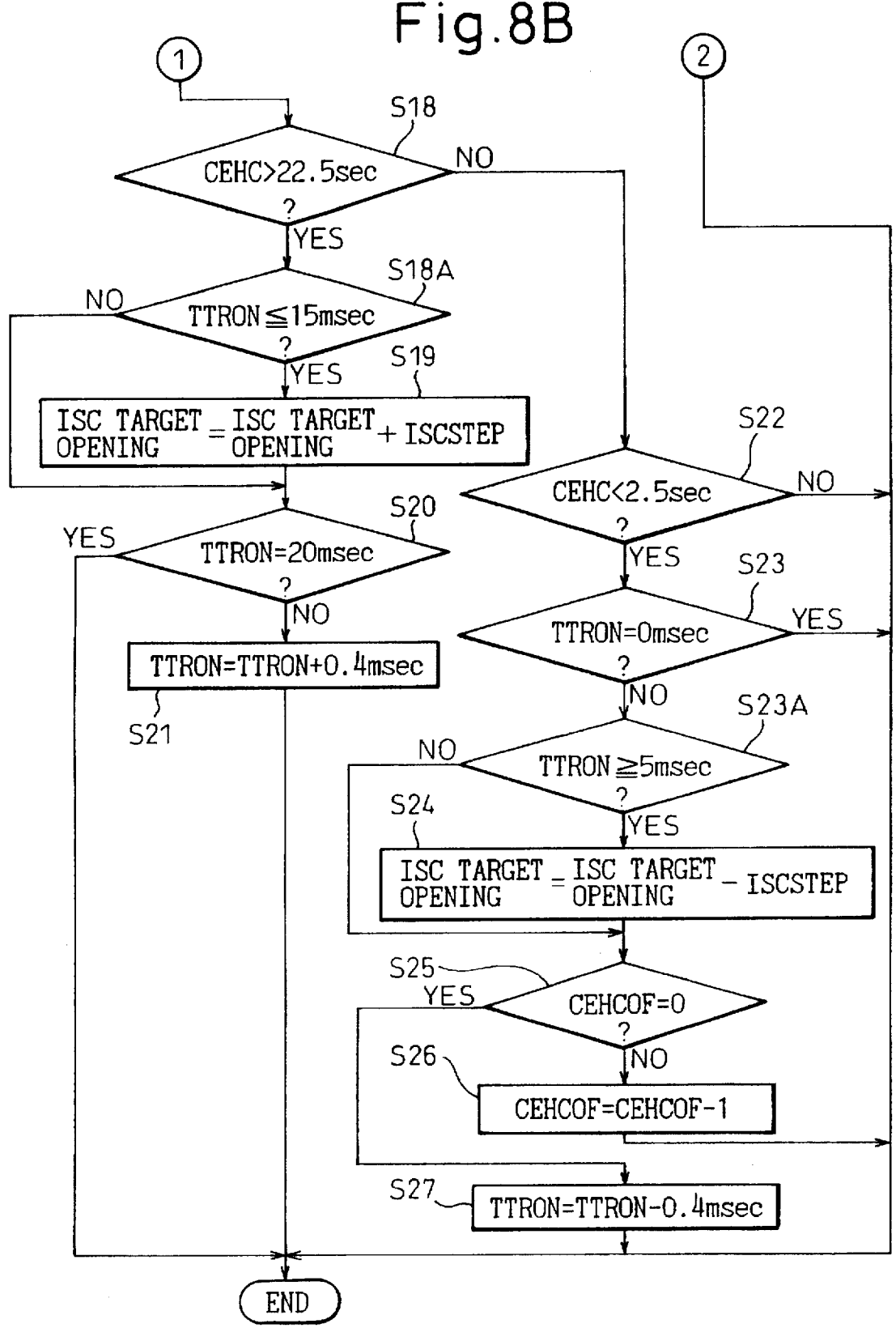
FIG. 8B is another half of a flowchart shown in FIG. 8A.

FIG. 6 is a time chart showing the second post-engine-start control technique, FIG. 7 is a flowchart showing a main routine of the technique, and FIGS. 8A and 8B are a flowchart showing an interrupt routine of the technique carried out at intervals of 32 msec. The flowchart of FIG. 7 differs from that of FIG. 4 in steps S1 and S3. Step S1 sets the EHC total operation time counter CEHC to 25 sec, the EHC start time counter CEHCON to 10, the EHC end time counter CEHCOF to 10, and an alternator ON counter TTRON to 0 msec. The setting value of the counter TTRON indicates an energization time of a magnetic field transistor of the alternator 2 that is energized at duty cycles of 20 msec. Step S3 sets the opening ISCSTEP of the idling speed controller (ISC) valve (28 of FIG. 2) to one step.

Steps S11 to S16 of FIGS. 8A and 8B are the same as those of FIGS. 5A and 5B, and therefore, are not explained again. Steps S12 to S17 check the EHC start flag XEHCST to see if the operating conditions of the electrically heated catalyst (EHC) 4 are met. If the conditions are met at t1, the EHC total operation time counter CEHC is decreased by 32 msec. At the same time, the target opening of the ISC valve is increased. More precisely, whenever the interrupt routine is carried out, a pulse is applied to the stepping motor (27 of FIG. 2) to increase the opening of the ISC valve from t1. This operation ends at t3. At t2 (320 msec after t1), the relay 7 is switched from the battery 8 to the EHC 4. At the same time, the duration of the field current of the alternator 2 is increased by 0.4 msec at intervals of 32 msec, i.e., whenever the interrupt routine is carried out, until a limit duty factor is obtained at t4. Step S20 checks to see if TTRON=20 (msec), i.e., if it is at t4 where a limit duty factor of 100% is attained. If the duty factor is 0% at t2 and reaches 100% at t4, a period between t2 and t4 is (0.4/20)×32 (msec)=1.6 sec.

Step S22 determines whether or not 22.5 seconds have passed after the start of the interrupt routine, i.e., whether or not it is at t5. If it is at t5, step S24 decrements the target opening of the ISC valve by one step whenever the interrupt routine is carried out at intervals of 32 msec. Step S25 determines whether or not 320 msec have passed from t5, i.e., whether or not it is at t6. If it is at t6, step S27 gradually decreases the field current of the alternator 2 whenever the interrupt routine is carried out at intervals of 32 msec. Namely, the duration of the field current of the alternator 2 is decreased by 0.4 msec whenever the interrupt routine is carried out at intervals of 32 msec. At t8, the duty factor of the field current reaches a proper level, and the interrupt routine ends. Steps S17 to S27 will be individually explained.

Step S17 switches the relay 9 from the battery 8 to the EHC 4. Then, stops regulation of the field current of the alternator 2 so that the field current can be increased above a limit set for the battery 8. Then, step S18 is carried out.

Step S18 checks to see if CEHC>22.5 sec. If the EHC total operation time counter CEHC is greater than 22.5, i.e., if 22.5 seconds have passed after the start of the interrupt routine, step S18A is carried out, and if not, step S22 is carried out.

Step S18A determines whether or not the alternator ON counter TTRON is 15 msec or less. If TTRON<15, i.e., if it is between t1 and t3, step S19 is carried out, and if not, i.e., if it is after t3, step S20 is carried out, wherein t3 is 1.2 sec after t2.

Step S19 adds ISCSTEP of one step set in step S3 to the target opening of the ISC valve calculated in step S11 and increases the opening of the ISC valve accordingly from t1.

Step S20 determines whether or not the alternator ON counter TTRON is 20 msec. If TTRON=20, the interrupt routine ends, and if not, step S21 is carried out.

Step S21 calculates TTRON=TTRON+0.4 (msec) and terminates the interrupt routine.

The time when step S17 switches the relay 9 from the battery 8 to the EHC 4 is t2 that is 320 msec behind t1. The opening of the ISC valve is gradually increased from t1, and 320 msec after t1, the quantity of intake air into the engine 1 starts to gradually increase due to the increasing opening of the ISC valve. In response to the increasing quantity of intake air, the air-fuel ratio control gradually increases the quantity of injecting fuel, to gradually increase the torque of the engine 1. The alternator 2 supplies power to the EHC 4 from t2, and at the same time, the regulator 7 gradually increases the field current of the alternator 2, to gradually increase the load on the engine 1. Even with the increasing load on the engine 1, the engine speed NE is unchanged because the opening of the ISC valve is gradually increased to gradually increase the torque of the engine 1. When the quantity of intake air to the engine 1 is gradually increased between t1 and t3, the engine speed NE may gradually increase. However, during the period between t2 and t4 that is 320 msec behind the period between t1 and t3, power generated by the alternator 2 gradually increases to gradually increase load on the engine 1. Accordingly, the increase in the engine speed NE never provides the driver with an uncomfortable feeling.

Step S22 checks to see if CEHC<2.5 (sec). If the EHC total operation time counter CEHC is smaller than 2.5, step S23 is carried out, and if not, the interrupt routine ends. If CEHC<2.5 (sec), 22.5 seconds have passed after the start of the interrupt routine.

Step S23 determines whether or not the alternator ON counter TTRON is 0 msec. If TTRON=0 (msec), terminates the interrupt routine, and if not, step S23A is carried out.

Step S23A determines whether or not the alternator ON counter TTRON is 5 msec or more. If TTRON≧5, i.e., if it is between t5 and t7, step S24 is carried out, and if not, i.e., if it is after t7, step S25 is carried out, wherein t7 is 1.2 sec after t6.

Step S24 subtracts ISCSTEP of one step set in step S3 from the target opening of the ISC valve calculated in step S11 and reduces the opening of the ISC valve accordingly from t5.

Step S25 checks to see if the EHC end time counter CEHCOF is 0, i.e., if the interrupt routine has been executed 10 times after t5, i.e., if 320 msec have passed after t5. If CEHCOF=0, step S27 is carried out, and if not, step S26 is carried out. Namely, the field current of the alternator 2 is gradually decreased from t6 that is 320 msec behind t5.

Step S26 calculates CEHCOF=CEHCOF–1, then the routine is terminated.

Step S27 calculates TTRON=TTRON–0.4 (msec). Then, the interrupt routine ends.

In this way, the opening of the ISC valve starts to decrease at t5, and at t6, that is 320 msec behind t5, the quantity of intake air into the engine 1 starts to decrease in response to the decreasing opening of the ISC valve. In response to this, the air-fuel ratio control decreases the quantity of injecting fuel, to decrease the torque of the engine 1. At t8, the alternator 2 stops supplying power to the EHC 4 and starts to supply power to the battery 8. At the same time, the regulator 7 suppresses the field current of the alternator 2, to reduce load on the engine 1. Even with the decreasing load on the engine 1, the engine speed NE is unchanged because the opening of the ISC valve has been decreased to reduce the torque of the engine 1. When the quantity of intake air into the engine is gradually reduced between t5 and t7, the engine speed NE may gradually increase. However, during the period between t6 and t8, that is 320 msec behind the period between t5 and t7, power generated by the alternator 2 gradually decreases to gradually reduce load on the engine 1. Accordingly, the decrease in the engine speed NE never provides the driver with an uncomfortable feeling.

Figure 9:
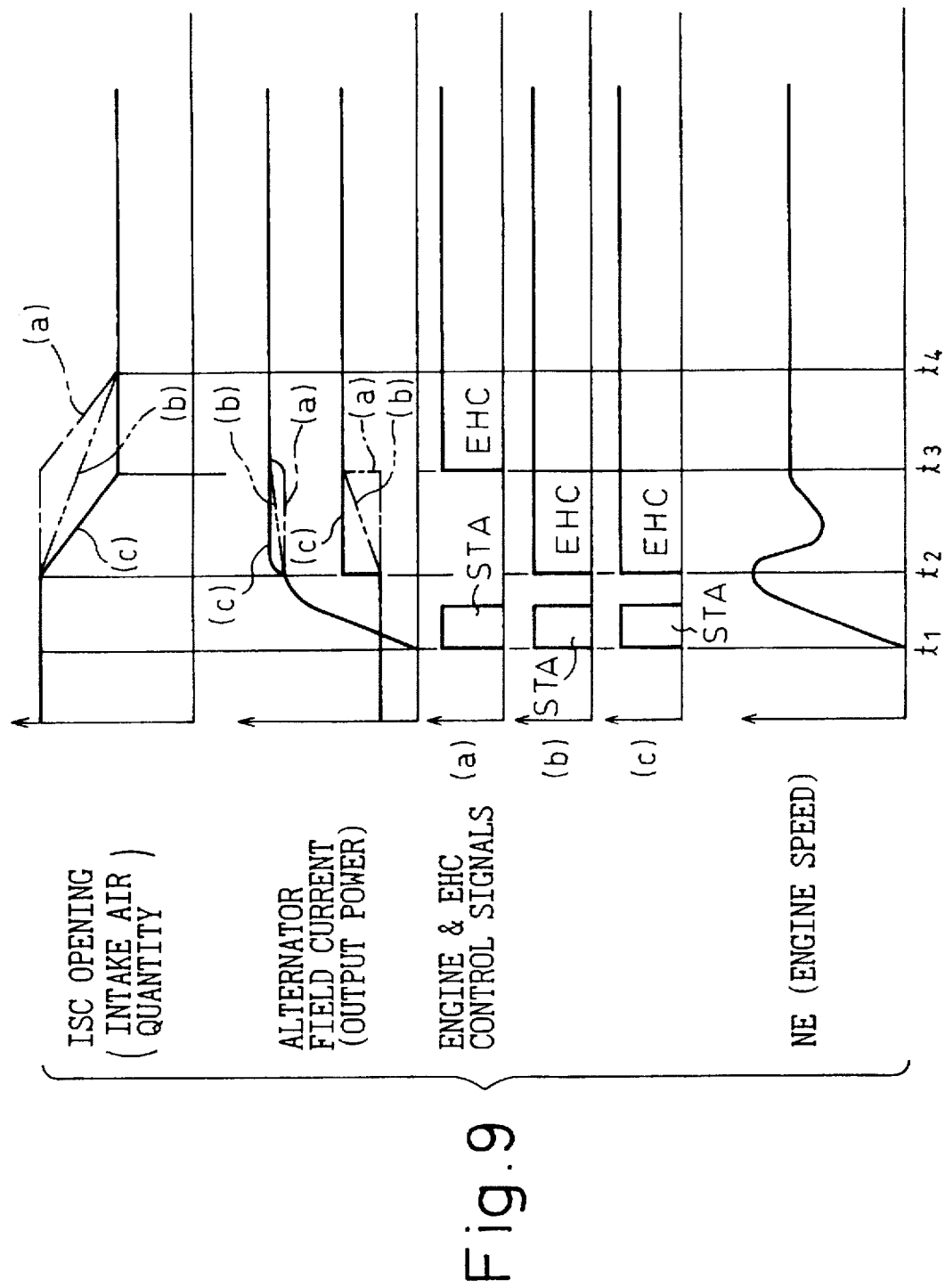
FIG. 9 is a time chart showing first and second on-engine-start control techniques that control an engine speed at the start of the engine.
Figure 10:
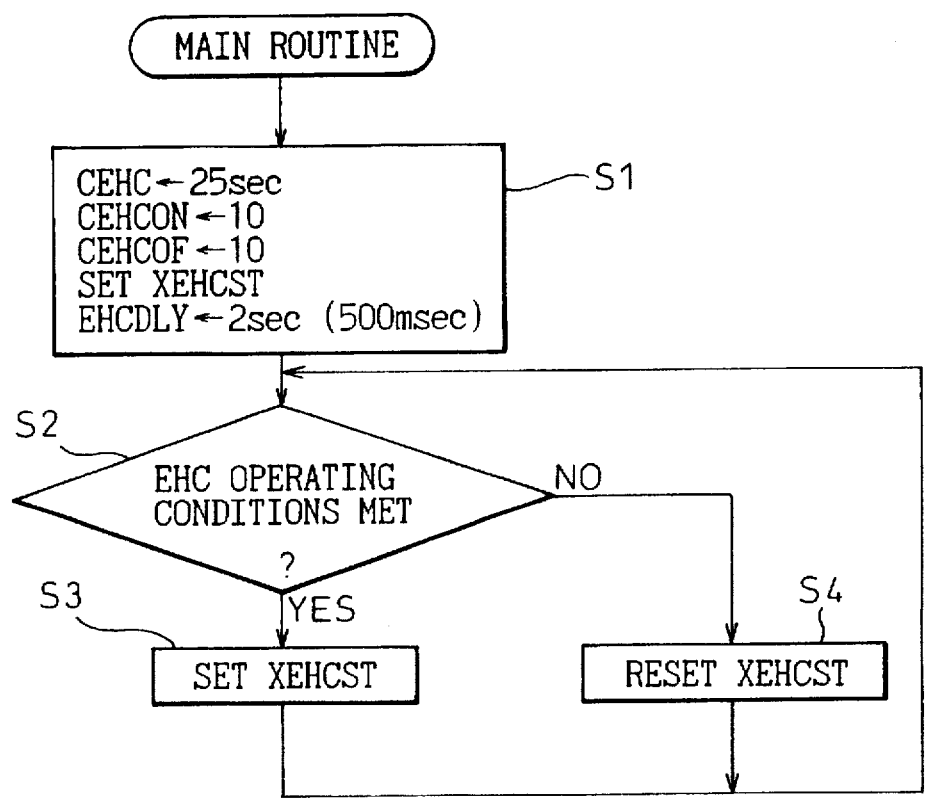
FIG. 10 is a flowchart showing a main routine of the first and second on-engine-start control techniques.
Figure 11:
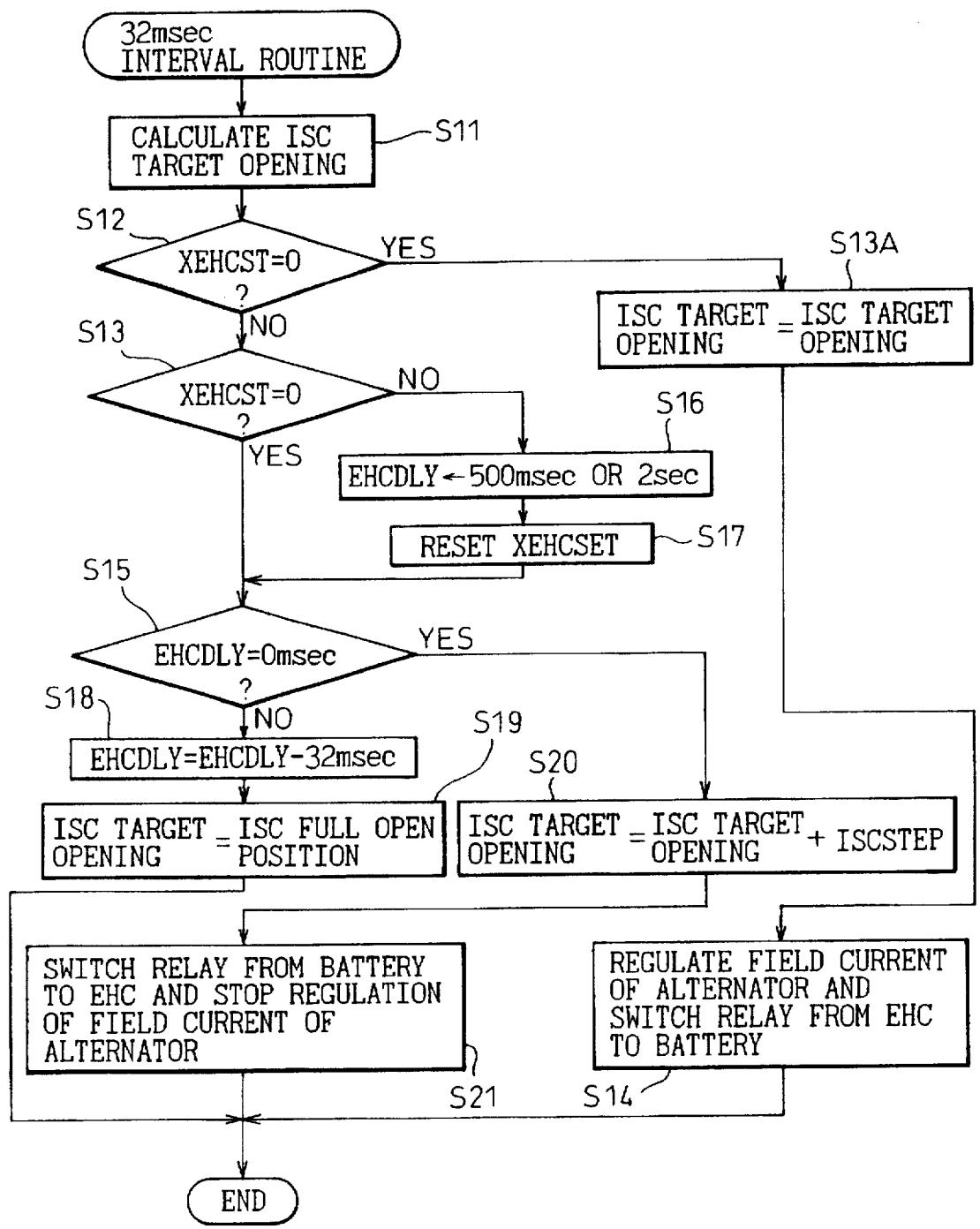
FIG. 11 is a flowchart showing an interrupt routine of the first on-engine-start control technique.

FIG. 9 is a time chart showing the first on-engine-start control technique, FIG. 10 is a flowchart showing a main routine of the technique, and FIG. 11 is a flowchart showing an interrupt routine of the technique carried out at intervals of 32 msec. As indicated with a dot-dash line (a) in FIG. 9, the idling speed controller (ISC) valve (28 of FIG. 2) is fully opened at the start of the engine for a given period, and thereafter, is gradually closed to a target opening. The flowchart of FIG. 10 differs from that of FIG. 4 only in steps S1 and S3. Step S1 sets the EHC total operation time counter CEHC to 25 sec, the EHC start time counter CEHCON to 10, the EHC end time counter CEHCOF to 10, an EHC setting flag XEHCSET to ON, and an EHC delay timer EHCDLY to 2 sec or 500 msec. Step S3 sets the EHC start flag XEHCST to ON. The EHC delay timer EHCDLY will be explained. The dot-dash line (a) at the top of FIG. 9 is obtained when a distance between the ISC valve and the engine 1 is longer than usual. In this case, the ISC valve is fully opened for a longer period than usual, and therefore, the delay timer EHCDLY is set to, for example, 2 sec. A continuous line (c) at the top of FIG. 9 is obtained when the distance between the ISC valve and the engine 1 is usual. In this case, the ISC valve is fully opened for a normal period, and therefore, the delay timer EHCDLY is set to, for example, 500 msec. This is to maximize the quantity of intake air as well as the torque of the engine 1 until intake air and corresponding fuel make the torque of the engine increase. The case represented with a two-dot line (b) also sets the delay timer EHCDLY to 500 msec.

Steps S11, S12, and S14 of FIG. 11 are the same as those of FIG. 5, and therefore, are not explained again. When step S12 determines that the EHC start flag XEHCST is ON, step S13 determines whether or not the EHC setting flag XEHCSET is ON at t1. At this time, the engine is started, and a start signal STA is supplied to the control unit 5. In the first cycle of this interrupt routine, step S12 detects XEHCST=1 and steps S16 and S17 are carried out because XEHCSET=1 in step S13. In the following cycles, step S15 is carried out instead of steps S16 and S17 because the first cycle sets XEHCSET=0. When step S12 detects XEHCST=0, step S13A is carried out. Step S13A sets the opening calculated in step S11 as a target opening of the ISC valve, then step S14 is carried out.

In the first cycle, step S16 sets the delay timer EHCDLY to 2 sec for the case (a) and to 500 msec for the case (c). Step S17 sets the EHC setting flag XEHCSET to OFF, and step S15 is carried out. Accordingly, in the following cycles, step S13 determines that XEHCSET=OFF, and step S15 is carried out.

Step S15 checks to see if EHCDLY=0. If EHCDLY=0, step S20 is carried out at t3 (2 sec after t1) in the case (a) and at t2 (500 msec after t1) in the case (c). Step S20 keeps the present ISC valve opening speed and increments the opening calculated in step S11 as a target opening of the ISC valve by ISCSTEP of 5 steps set in step S3. Then, step S21 is carried out. If EHCDLY is not 0 in step S15, step S18 is carried out.

Step S18 calculates EHCDLY=EHCDLY–32 (msec), i.e., "2000–32" in the case (a) and "500–32" in the case (c). Then, step S19 is carried out.

Step S19 keeps the present ISC valve opening speed and sets a full open position as a target opening of the ISC valve. Then, the interrupt routine ends. The ISC valve opening speed is changed by changing the period of each pulse for driving the stepping motor (27 of FIG. 2) that opens and closes the ISC valve (28 of FIG. 2).

Step S21 switches the relay 9 from the battery 8 to the EHC 4 and increases the field current of the alternator 2 by releasing the suppressing operation of the alternator 2 for the battery 8. Then, the interrupt routine ends.

In this way, the first on-engine-start control technique starts to reduce the opening of the ISC valve 500 msec after t1 in the case (c) and 2 sec after t1 in the case (a) depending on the distance between the ISC valve and the engine 1. Accordingly, the torque of the engine 1 is maximized for 500 msec from t1 to t2 in the case (c), and for 2 sec from t1 to t3 in the case (a). The opening of the ISC valve starts to be reduced to a target opening at t2 in the case (c) and at t3 in the case (a). The target opening is achieved at t3 in the case (c), and at t4 in the case (a).

At t2 in the case (c) and at t3 in the case (a), the alternator 2 starts to supply power to the EHC 4, and the field current of the alternator 2 is increased to increase the load on the engine 1, to quickly heat the EHC 4. Until the ISC valve reaches the target opening from the full open state, the torque of the engine 1 is balanced with the load on the engine 1, to keep the engine speed NE unchanged and provide the driver with no uncomfortable feeling. At t4 in the case (a) and at t3 in the case (c), one of the first and second post-engine-start control techniques is carried out as explained above.

Figure 12:
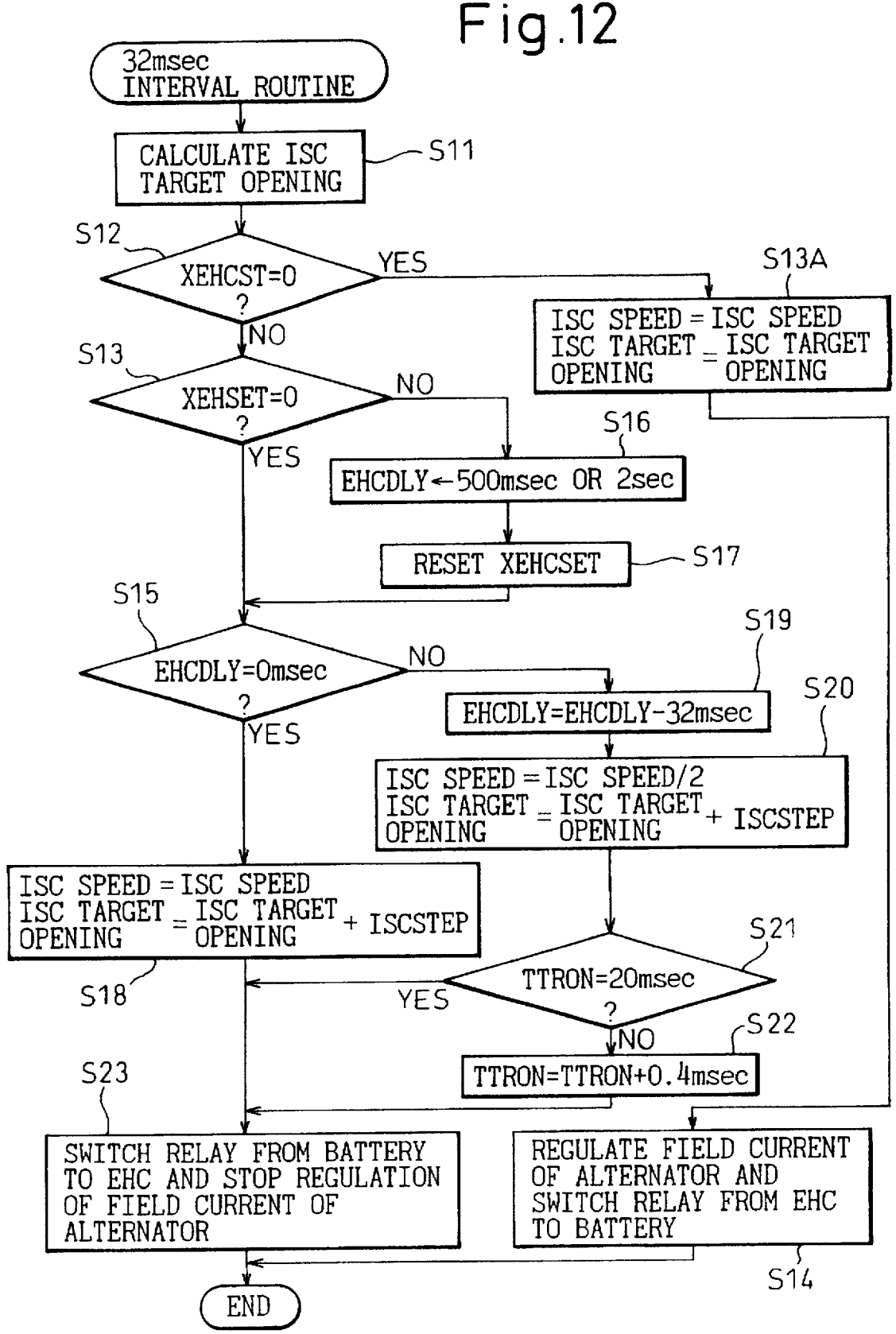
FIG. 12 is a flowchart showing an interrupt routine of the second on-engine-start control technique.

The second on-engine-start control technique will be explained with reference to FIGS. 9, 10, and 12. FIG. 9 is a time chart showing the technique, FIG. 10 shows a main routine of the technique, and FIG. 12 shows an interrupt routine of the technique carried out at intervals of 32 msec. A two-dot line (b) at the top of FIG. 9 is obtained when the distance between the idling speed controller (ISC) valve (28 of FIG. 2) and the engine 1 is longer than usual. In this case, the ISC valve is changed from the full open position to a target opening at a slower speed than usual. Step S1 of FIG. 10 sets the EHC delay timer EHCDLY to 500 msec. This is the only difference of the second on-engine-start control technique from the first one. The flowchart of FIG. 12 differs from that of FIG. 11 in steps S18 to S23. These steps will be explained.

In steps S13A, S18 and S20, the ISC valve opening speed is unchanged. Step S15 checks to see if EHCDLY=0. If EHCDLY=0, t2 is 500 msec behind t1. At this moment, step S18 keeps the present ISC valve opening speed and increments the opening calculated in Step S11 as a target opening of the ISC valve by ISCSTEP of 5 steps set in step S3. If EHCDLY is not 0 in step S15, step S19 calculates EHCDLY=EHCDLY−32 (msec), i.e., "2000−32" in the case (a) and "500−32" in the case (c). Then, step S20 halves the ISC valve opening speed and increments the opening calculated in step S11 as a target opening of the ISC valve by ISCSTEP of 5 steps set in step S3. Then, step S21 is carried out. Halving the ISC valve opening speed slows the valve closing speed of the ISC valve as indicated with the two-dot line (b) at the top of FIG. 9. Accordingly, reaching the opening calculated in step S11 from the full open state takes longer than in the case (c) that keeps the present ISC valve speed. Namely, the case (b) attains the target opening at t4 that is behind t3 at which the case (c) attains the target opening.

Step S21 determines whether or not the alternator ON counter TTRON is 20 msec. If TTRON=20 (msec), step S23 is carried out, and if not, step S22 is carried out.

Step S22 calculates TTRON=TTRON+0.4 (msec) and step S23 is carried out.

Steps S21 and S22 gradually increase the field current of the alternator 2, to avoid a sudden increase in load on the engine 1.

Step S23 switches the relay 9 at t2 from the battery 8 to the EHC 4 and increases the field current of the alternator 2 by releasing the suppressing operation for the battery 8.

In this way, the second on-engine-start control technique determines an ISC valve opening speed according to the length between the ISC valve and the engine 1. The ISC valve opening speed is unchanged in the case (c) and halved in the case (b) when reducing the opening of the ISC valve. The ISC valve is changed from the full open position to a target opening in the period between t2 and t3 in the case (c) and between t2 and t4 in the case (b). Intake air passing through the ISC valve and fuel injected in response to the intake air are fed into the engine 1 and are burned to provide torque. The torque is at the maximum up to t2, that is 500 msec after t1, in each of the cases (c) and (b). In each of the cases (c) and (b), the opening of the ISC valve starts to be reduced at t2 and reaches a target opening at t3 in the case (c) and at t4 in the case (b). In each of the cases (c) and (b), the alternator 2 starts to supply power to the EHC 4 at t2. The regulator 7 gradually increases the field current of the alternator 2 to gradually increase the load on the engine 1. During the period in which the ISC valve is changed from the full open position to a target opening, the torque of the engine 1 due to the ISC valve balances with load on the engine 1 due to an increase in the field current of the alternator 2. Accordingly, the engine speed NE is unchanged, and therefore, the driver never feels uncomfortable. At t4 in the case (a) and at t3 in the case (c), one of the first and second post-engine-start control techniques is carried out as explained above.

As explained above, the present invention activates an electrically heated catalyst of an internal combustion engine by supplying sufficient power to the catalyst without fluctuating the rotation speed of the engine. Accordingly, the present invention quickly activates the catalyst without giving the driver an uncomfortable feeling.

What is claimed is:

1. An apparatus for controlling an internal combustion engine comprising:

an alternator driven by the engine, a battery charged by the alternator, means for changing a rotational speed of the engine, wherein the engine speed changing means increases the rotational speed of the engine when the catalyst receives power, means for changing a quantity of intake air fed into the engine, an electrically heated catalyst powered by at least one of the alternator and the battery, and means for changing an amount of power generated by the alternator, wherein the generating power changing means increases the amount of power generated by the alternator when the catalyst receives power from one of the alternator and the battery and wherein the generating power changing means changes a field current of the alternator, to change the amount of power generated by the alternator, and means for delaying a start of an increase of the field current of the alternator until a predetermined period of time has elapsed after the means for changing the quantity of intake air has begun to increase the quantity of intake air.

2. The apparatus of claim 1, wherein:

the generating power changing means changes a field current of the alternator, to change the amount of power generated by the alternator; and the apparatus comprises means for gradually increasing a quantity of intake air as well as the field current of the alternator.

* * * * *